(12) United States Patent
Agarwal et al.

(10) Patent No.: US 11,175,917 B1
(45) Date of Patent: Nov. 16, 2021

(54) BUFFER FOR REPLAYED LOADS IN PARALLEL WITH RESERVATION STATION FOR RAPID RESCHEDULING

(71) Applicant: Apple Inc., Cupertino, CA (US)

(72) Inventors: Mridul Agarwal, Sunnyvale, CA (US); Kulin N. Kothari, Cupertino, CA (US); Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/018,875

(22) Filed: Sep. 11, 2020

(51) Int. Cl.
 *G06F 9/38* (2018.01)
 *G06F 11/14* (2006.01)
 *G06F 9/30* (2018.01)
 *G06F 9/48* (2006.01)

(52) U.S. Cl.
 CPC ........ *G06F 9/30043* (2013.01); *G06F 9/3838* (2013.01); *G06F 9/4881* (2013.01)

(58) Field of Classification Search
 None
 See application file for complete search history.

(56) References Cited

U.S. PATENT DOCUMENTS

| | | |
|---|---|---|
| 6,006,326 A | 12/1999 | Panwar et al. |
| 7,165,167 B2 | 1/2007 | Filippo et al. |
| 8,533,438 B2 | 9/2013 | Hooker et al. |
| 9,483,273 B2 | 11/2016 | Spadini et al. |
| 10,133,571 B1* | 11/2018 | Kesiraju ............. G06F 9/30043 |
| 2006/0109378 A1* | 5/2006 | Yang .................... H04N 21/435 348/465 |
| 2008/0086623 A1* | 4/2008 | Lien ...................... G06F 9/3842 712/218 |
| 2009/0322959 A1* | 12/2009 | Iwashiro .......... H04N 21/44231 348/725 |
| 2017/0351610 A1* | 12/2017 | Tran ..................... G06F 12/0875 |
| 2018/0095765 A1* | 4/2018 | Mekkat ................... G06F 8/445 |
| 2021/0072997 A1* | 3/2021 | Kothari ................. G06F 9/3867 |

* cited by examiner

*Primary Examiner* — Hyun Nam
(74) *Attorney, Agent, or Firm* — Kowert, Hood, Munyon, Rankin & Goetzel, P.C.; Lawrence J. Merkel

(57) ABSTRACT

In an embodiment, a processor comprises a reservation station that issues a first load operation for execution, a store queue, and a replayed load buffer coupled in parallel with the reservation station. During execution of the first load operation, the store queue detects that the first load operation hits on a first store operation in the store queue that lacks store data and causes a replay of the first load operation. The replayed load buffer captures an identifier of the first load operation and the first store operation based on the replay of the first load operation, wherein the replayed load buffer monitors the reservation station for issuance of a first store data operation corresponding to the first store operation and issues the first load operation for reexecution based on the issuance of the first store data operation.

20 Claims, 8 Drawing Sheets

BUFFER FOR REPLAYED LOADS IN PARALLEL WITH RESERVATION STATION FOR RAPID RESCHEDULING

BACKGROUND

Technical Field

Embodiments described herein are related to processors and, more particularly to load/store execution in processors.

Description of the Related Art

Processors use load/store operations to access memory. Load operations read data from memory into the processor, and store operations write data from the processor to memory. For example, load operations can read data into processor registers that can be used as operands of other instructions, and store operations can write data from the processor registers to memory.

The data read by the load operations is often needed as operands for other instructions in the processor, while store operations are often used to write result data to memory after computation on the results is completed (at least temporarily). Accordingly, performing the load operations is often more performance-critical than performing the store operations. Typically, store operations are executed, probe a local (level 1, or L1) data cache, and then wait in a store queue to retire (when they can update the data cache and/or memory). Load operations execute and forward data to dependent operations from the data cache (or memory, in the event of a data cache miss). Since there can be stores in the store queue, the load operations check for a hit on an older store in the store queue (a hit occurs, e.g., if an older store writes one or more bytes read by the load). If a hit on the store queue occurs, the data from the store queue can be forwarded as the result of the load. However, in some cases, the store operation can be in the store queue, but the store data is not yet available. In this case, execution of the load operation is delayed (e.g. replayed) until the store data is available. Replaying the load operation at a later time is often slower, with respect to the arrival of the store data, than if the dependency on the store data were known in advance and the load operation were delayed until the store data arrived. Performance of the processor can suffer as a result.

SUMMARY

In an embodiment, a processor comprises a reservation station configured to issue a first load operation for execution, a store queue configured to hold store operations that have been executed but have not committed, and a replayed load buffer coupled in parallel with the reservation station. The store queue is configured to detect that the first load operation hits on a first store operation in the store queue during execution of the first load operation, and is configured to cause a replay of the first load operation based on the detection of a hit on the first store operation and a lack of first store data associated with the first store operation in the store queue. The replayed load buffer is configured to capture an identifier of the first load operation and the first store operation based on the replay of the first load operation. The replayed load buffer is configured to monitor the reservation station for issuance of a first store data operation corresponding to the first store operation and to issue the first load operation for reexecution based on the issuance of the first store data operation. The latency to complete the replayed load may be similar to the latency to complete a load that was detected as dependent on the store operation, in an embodiment, which may be a lower latency that replaying the load from a post-execution load buffer.

BRIEF DESCRIPTION OF THE DRAWINGS

The following detailed description refers to the accompanying drawings, which are now briefly described.

Figure 1:
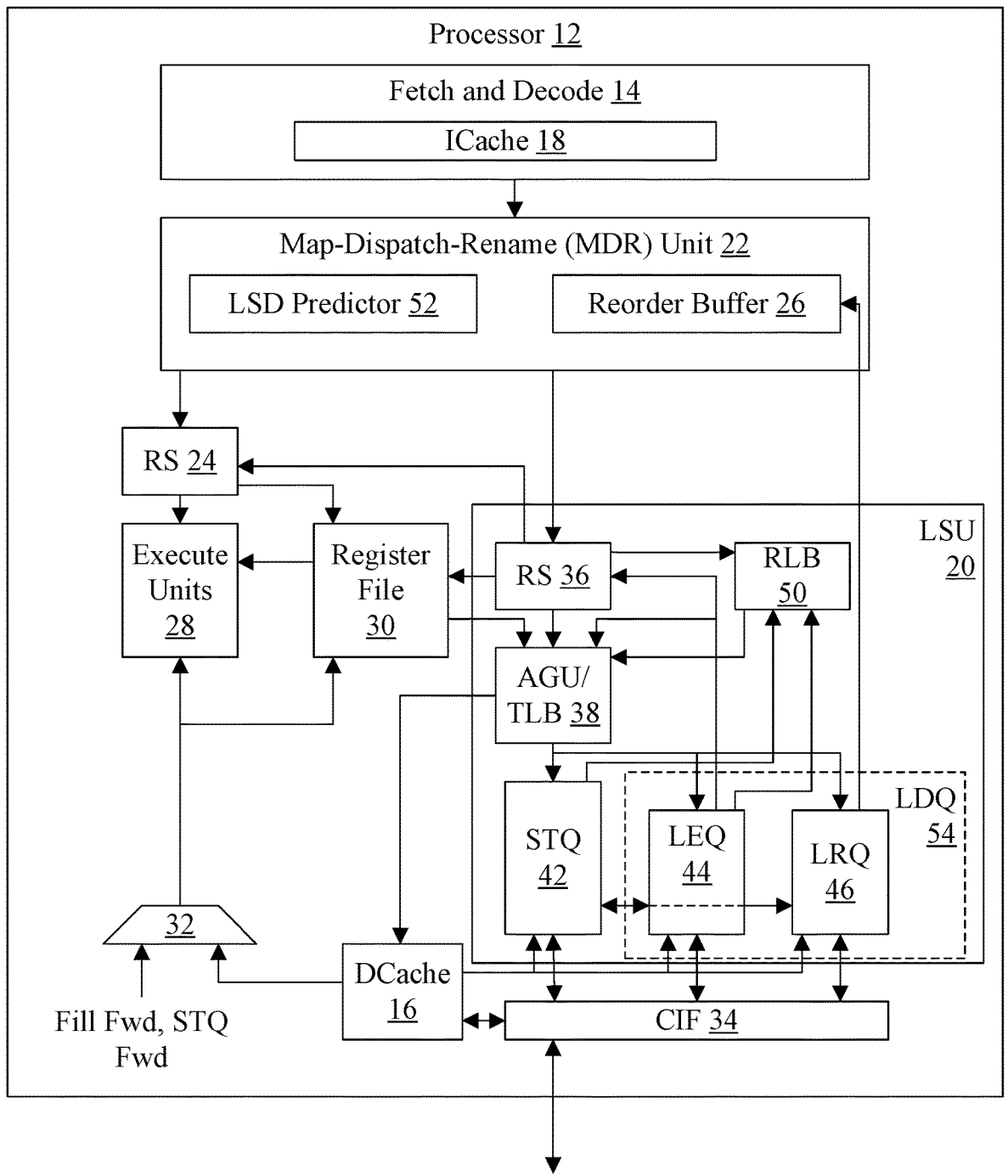
FIG. 1 is a block diagram of a processor including a load/store unit having a reservation station and a replayed load buffer in parallel with the reservation station.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of a processor 12 is shown. In the illustrated embodiment, the processor 12 includes a fetch and decode unit 14 (including an instruction cache, or ICache, 18), a map-dispatch-rename (MDR) unit 22 (including a load/store dependency (LSD) predictor 52 and a reorder buffer 26), one or more reservation stations 24, one or more execute units 28, a register file 30, a data cache (DCache) 16, a load/store unit (LSU) 20, and a core interface unit (CIF) 34. The fetch and decode unit 14 is coupled to the MDR unit 22, which is coupled to the reservation stations 24 and the LSU 20. More particularly, the MDR unit 22 is coupled to a reservation station (RS) 36 in the LSU 20. The reservation stations 24 are coupled to the execution units 28. The reorder buffer 26 is coupled to a load retirement queue (LRQ) 46 in the LSU 20. The register file 30 is coupled to the execute units 28 and the LSU 20 (and more particularly the reservation station 36 and an address generation unit/translation lookaside buffer (AGU/TLB) 38). The AGU/TLB 38 is also coupled to the DCache 16, which is coupled to the CIF 34 and to a multiplexor 32 which is coupled to the execute units 28 and the register file 30. Another input of the mux 32 is coupled to receive other data (e.g. fill forward data from the CIF 34 and/or store queue forward data from a store queue 42 (STQ 42) in the LSU 20. The DCache 16 is further coupled to the STQ 42, the LRQ 46, and a load execute queue (LEQ) 44 in the LSU 20. The AGU/TLB 38 is coupled to the reservation station 36, the STQ 42, the LEQ 44, the LRQ 46, and a replayed load buffer (RLB) 50. The STQ 42 is coupled to the LEQ 44, the LRQ 46, and the RLB 50. The STQ 42, the LEQ 44, and the LRQ 46 are coupled to the CIF 34. The LEQ 44 is also coupled to the RS 36 and the RLB 50. The RLB 50 is further coupled to the RS 36 and the AGU/TLB 38. The load and store pipelines include stages that are coupled to the various components in the LSU 20 as shown in FIG. 1, e.g. as described below with regard to FIGS. 2-5.

The fetch and decode unit 14 may be configured to fetch instructions for execution by the processor 12 and decode the instructions into ops for execution. More particularly, the fetch and decode unit 14 may be configured to cache instructions previously fetched from memory (through the CIF 34) in the ICache 18, and may be configured to fetch a speculative path of instructions for the processor 12. The fetch and decode unit 14 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 14 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the instruction operation may be essentially synonymous with instruction (although it may be modified in form by the decoder). The term "instruction operation" may be more briefly referred to herein as "op."

The MDR unit 22 may be configured to map the ops to speculative resources (e.g. physical registers) to permit out-of-order and/or speculative execution, and may dispatch the ops to the reservation stations 24 and the LSU 20. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The MDR unit 22 may manage the mapping of the architected registers to physical registers. There may be separate physical registers for different operand types (e.g. integer, media, floating point, etc.) in an embodiment. In other embodiments, the physical registers may be shared over operand types. The MDR unit 22 may also be responsible for tracking the speculative execution and retiring ops or flushing misspeculated ops. The reorder buffer 26 may be used to track the program order of ops and manage retirement/flush.

Ops may be scheduled for execution when the source operands for the ops are ready. In the illustrated embodiment, decentralized scheduling is used for each of the execution units 28 and the LSU 20, e.g. in reservation station 36 in the LSU 20 and reservation stations 24 for other execution units 28. Other embodiments may implement a centralized scheduler if desired.

The LSU 20 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 36, which may be configured to monitor the source operands of the operations to determine when they are available and then issue the operations to the load or store pipelines, respectively. The AGU/TLB 38 may be coupled to one or more initial stages of the pipelines, as discussed below. Some source operands may be available when the operations are received in the reservation station 36, which may be indicated in the data received by the reservation station 36 from the MDR unit 22 for the corresponding operation. Other operands may become available via execution of operations by other execution units 28 or even via execution of earlier load ops. The operands may be gathered by the reservation station 36, or may be read from a register file 30 upon issue from the reservation station 36 as shown in FIG. 1.

In an embodiment, the reservation station 36 may be configured to issue load/store ops out of order (from their original order in the code sequence being executed by the processor 12, referred to as "program order") as the operands become available. To ensure that there is space in the LRQ 46 or the STQ 42 for older operations that are bypassed by younger operations in the reservation station 36, the MDR unit 22 may include circuitry that preallocates LRQ 46 or STQ 42 entries to operations transmitted to the load/store unit 20. If there is not an available LRQ entry for a load being processed in the MDR unit 22, the MDR unit 22 may stall dispatch of the load op and subsequent ops in program order until one or more LRQ entries become available. Similarly, if there is not a STQ entry available for a store, the MDR unit 22 may stall op dispatch until one or more STQ entries become available. In other embodiments, the reservation station 36 may issue operations in program order and LRQ 46/STQ 42 assignment may occur at issue from the reservation station 36. The RS 36 may be configured to delete a load operation responsive to issuance of the load operation from the RS 36 (relying the on the LEQ 44 and/or the RLB 50 to manage replays of the load operation and the LRQ 46 to handle flushing/retirement of the load operation).

The LRQ 46 may track loads from initial execution to retirement by the LSU 20. The LRQ 46 may be responsible for ensuring the memory ordering rules are not violated (between out of order executed loads, as well as between loads and stores). If a memory ordering violation is detected, the LRQ 46 may signal a redirect for the corresponding load. A redirect may cause the processor 12 to flush the load and subsequent ops in program order, and refetch the corresponding instructions. Speculative state for the load and subsequent ops may be discarded and the ops may be refetched by the fetch and decode unit 14 and reprocessed to be executed again.

Because redirects are costly (e.g. in both performance lost and power consumed), the processor 12 may implement various mechanisms to attempt to avoid redirects. For example, the LSD predictor 52 may be provided to predict load ops that may experience an ordering violation with an older store op. The LSD predictor 52 may identify the earlier store op, and a dependency of the load op on the store op may be indicated so that the load op is not speculatively issued prior to the store op. The LSD predictor 52 may be trained by the LRQ 46 when flush events for ordering violations are detected.

The LEQ 44, on the other hand, may track loads from initial execution to completion. A load may be complete when it has successfully forwarded data to its target register (and thus ops dependent on the load may be speculatively executed) and the load may not be replayed. Completed loads may subsequently be redirected due to memory ordering violations or other issues detected by the LRQ 46, but may not attempt to forward data again without a redirect. Most loads may forward data without replay and may be immediately complete. There may be some loads, in some embodiments, which may successfully forward data and yet may not be complete. For example, certain load ops may be derived from "atomic" instructions, and may be subject to replay to verify that the access remained atomic. Other embodiments may implement atomicity in other fashions.

Since load/store ops may be executed out of order, it is possible that load/store ordering violations will occur. As mentioned above, the LRQ 46 may ensure that any ordering violations are detected and cause a flush when detected. More particularly, the LRQ 46 may compare the store physical address of a store (and corresponding size information) to the load physical address (and size information) of a younger load that executed out of order with respect to the store. If a hit is detected (e.g. at least one byte written by the store is read by the load, also referred to as an overlap between the load and the store), the LRQ 46 may flush the load. The LSD predictor 52 may be used to predict ordering violations and prevent the out of order scheduling based on the prediction. However, the LSD predictor 52 may be a finite structure and thus may not be able to store data to predict all previously-detected ordering violations. Additionally, the LSD predictor 52 may not be able to predict an ordering violation prior to the first detection of the ordering violation (and the corresponding flush).

When a load/store address op is issued by the reservation station 36, the AGU/TLB 38 may be configured to generate the address accessed by the load/store, and may be configured to translate the address from an effective or virtual address created from the address operands of the load/store address op to a physical address actually used to address memory. The AGU/TLB 38 may be configured to generate an access to the DCache 16. For load operations that hit in the DCache 16, data may be speculatively forwarded from the DCache 16 to the destination operand of the load operation (e.g. a register in the register file 30), unless the address hits a preceding operation in the STQ 42 (that is, an older store in program order) or the load is replayed. The data may also be forwarded to dependent ops that were speculatively scheduled and are in the execution units 28. The execution units 28 may bypass the forwarded data in place of the data output from the register file 30, in such cases. If the store data is available for forwarding on a STQ hit, the mux 32 may select data output by the STQ 42 for forwarding and the load need not be replayed due to the STQ hit. Cache misses and STQ hits where the data cannot be forwarded may be reasons for replay and the load data may not be forwarded in those cases. The cache hit/miss status from the DCache 16 may be logged in the STQ 42 or LRQ 46 for later processing.

The load operations may update the LRQ 46 entry preassigned to the load operations, and the store operations may update the STQ 42, to enforce ordering among operations. In one embodiment, the instruction set architecture implemented by the processor 12 may permit memory accesses to different addresses to occur out of order but may require memory accesses to the same address (or overlapping addresses, where at least one byte is accessed by both overlapping memory accesses) to occur in program order.

Additionally, loads may be replayed one or more times before successfully completing by forwarding data to the target register, in an embodiment. A replay occurs when a condition is detected during execution of the load, which prevents the load from forwarding data to its target location (e.g. its target register in the register file 30) but the condition may be temporary and thus re-executing the load at a later point may allow the load to successfully forward data and complete. For example, during execution, addresses of loads are compared to the stores in the STQ 42. If the load is to the same address as an older store in the STQ 42, and the data is not available for forwarding from the STQ 42 (e.g. the corresponding store data op has not executed), the load may be replayed so that the store data may be forwarded later (or the store may complete and the data may be available from the DCache 16). The virtual address of the load may miss in the TLB within the AGU/TLB 38, and thus the address may not be translated. The load may be replayed to obtain the translation and access the DCache 16. A load may miss in the DCache 16 and thus may be replayed to obtain the data later when the missing data is supplied to the DCache 16 in a cache fill (either as a fill forward or replaying through the DCache 16 as a cache hit after the fill). Resource conflicts may be a source of replays (e.g. a bank conflict in the DCache 16 and/or the TLB in the AGU/TLB 38 with a concurrently executing load/store op may cause the younger op to be replayed). Some loads may also require additional conditions in order to complete (e.g. they may need to be the oldest load, or may need to be non-speculative, due to the definition of the instruction from which the load is derived and/or attributes associated with the address in the translation). Accordingly, a given load may have an initial execution (issued from the reservation station 36, passing through the execution pipeline including the AGU/TLB 38 and DCache 16 access) and, if replayed during the initial execution, one or more additional execution passes through the load pipeline initiated from the LEQ 44. That is, replay may occur again during a replay execution pass due to a different conflict than the original replay, or possibly the same conflict in some cases.

The LEQ 44 may be used to manage replays. That is, a given load op may be allocated an LEQ entry when initially executed (e.g. issued by the RS 36), and the LEQ entry may be retained to replay the load until it successfully forwards data. The LEQ entry may be freed upon successfully data forwarding/completion of the given load op. The given load op may still have an entry in the LRQ 46 after completion, however, for ordering purposes.

In the case in which a load is replayed due to a hit in the STQ 42 on a store for which data is not yet available, the load may be retained in the LEQ 44 and may be prevented from replaying until the store data op that provides the store data to the STQ 42 executes. When the store data op is issued by the RS 36, the store propagates down the pipe like other load/store ops until it reaches the stage in which it can write the STQ 42. At that stage where the store writes data to the STQ 42, the store data op may also check against the LEQ 44 entries to determine if a load is ready to be replayed because it depends on the store data. Alternatively, the check on the LEQ 44 may occur at an earlier stage that is near enough to the STQ update that the update will have occurred before the replayed load reaches the STQ 42 to read the store data. In either case, the latency to complete the replay, from the issuance of the store data op from the RS 36, may be greater than the latency that the load op would have had if the dependency on the store had been predicted by the LSD predictor 52. In the case of prediction by the LSD predictor 52, the load op may be issued within one or two clock cycles of the store data op on which it is predicted to depend, for example.

The RLB 50 may be provided to reduce the latency of loads that are replayed due to a store queue hit when the data was not available. The RLB 50 may be coupled in parallel with the RS 36. The RLB 50 may comprise a plurality of entries, and a first entry of the plurality of entries may be allocated to a given load operation based on the replay of the given load operation due to the hit on a store operation in the STQ 42 while the store data is not available. The allocated entry in the RLB 50 may be made dependent on the store op in the RS 36. Similarly, a second load operation issued by the reservation station and replayed due to a hit on a second store operation in the STQ 52 may be allocated a second entry of the plurality of entries in the RLB 50 (different from the first entry).

The RS 36 may be configured to provide IDs of store data ops being issued by the RS 36, and the RLB 50 may clear one or more dependencies on the store data ops. A load op that was dependent on the store data op may be thus be re-issued. For example, the load op may be issued on the clock cycle following issuance of the store data op, or the second clock cycle following the issuance. Thus, the update of the store data in the store queue (and replay of the load op from the LEQ 44) may detected at a later pipeline stage than a pipeline stage at which the RLB 50 detects issuance of the store data operation.

More particularly, the RLB 50 may configured to capture an identifier of a first load operation that was replayed due to a hit in the STQ 42 on a first store operation. The RLB 50 may allocate an entry and capture the identifier based on the replay of the first load operation. The RLB 50 may be configured to monitor the reservation station for issuance of a first store data operation corresponding to the first store operation and to issue the first load operation for reexecution based on the issuance of the first store data operation. The RLB 50 may contain all of the data used to reexecute the load operation, in an embodiment. In another embodiment, the RLB 50 may store an identifier of the first load operation in the LEQ 44 for at least some data used during reexecution of the load operation, and other data may be stored in the RLB 50. Any combination of storing data in the RLB 50 and in the LEQ 44 may be used, in various embodiments. That is, a portion of the data describing the load operation may be stored in the RLB 50 and a remaining portion of the data may be stored in the LEQ 44. The LEQ 44 may be configured to insert the remaining portion into a load/store pipeline when the first load operation is reexecuted.

In an embodiment, the loads in the RLB 50 may also be in the LEQ 44, and thus the RLB 50 may be a performance-enhancing feature but may not be required for correct execution. Accordingly, if the RLB 50 is full when a given load is replayed due to a store queue hit on a store for which data is unavailable, the given load may be handled by the LEQ 44, similar to other replays.

The LEQ 44 need not have as many entries as the LRQ 46 to support the desired performance of the processor 12. A majority of loads under ordinary circumstances do not get replayed. That is, the majority of loads are issued by the RS 36, execute, and successfully forward data on the initial execution. Thus, the majority of loads have an LEQ entry 44 for only a short time, and then the entry is freed because the load did not replay. Because the LEQ 44 may be smaller than the LRQ 46, searching the LEQ 44 for loads that are ready to be replayed may be relatively low latency (as compared to the latency than might occur if the LRQ 46 were to be searched). Thus, the replays may be lower latency that would otherwise be possible if only the LRQ 46 were used, in an embodiment. For example, replays may be at least one clock cycle lower latency than would be possible if the LRQ 46 were used, in an embodiment.

The LSU 20 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 36 may issue any number of loads up to the number of load pipes in the same clock cycle. In an embodiment, the LEQ 44 may be banked and the number of banks may be equal to the number of load pipelines. Each LEQ bank may replay load ops on a respective one of the load pipes. That is, the LEQ bank may be dedicated to the respective load pipe and may only replay its loads on the respective load pipe. In an embodiment, allocation of a given load to one of the banks may be not be restricted to which pipe initially executes the given load. That is, loads may be allocated LEQ entries in any bank, independent of the load pipe in which they initially execute. If a given load replays, however, the replays occur on the load pipe based on which bank has the entry allocated to that given load. The replay path from the LEQ 44 is illustrated as the connection of the LEQ 44 to the AGU/TLB 38, in an embodiment. There may be parallel paths for each load pipe. In an embodiment, replays take priority over loads to be issued by the reservation station 36. Accordingly, the LEQ 44 may signal the reservation station 36 when a given load pipe is being used for replay, and the reservation station 36 may stall issue on that given load pipe for that clock cycle.

The LSU 20 may also implement one or more store pipes, and in particular may implement multiple store pipes. The number of store pipes need not equal the number of load pipes, however. In an embodiment, for example, two store pipes may be used. The reservation station 36 may issue store address ops and store data ops independently and in parallel to the store pipes. The store pipes may be coupled to the STQ 42, which may be configured to hold store operations that have been executed but have not committed. The STQ 42 is configured to detect that a first load operation hits on a first store operation in the store queue during execution of the first load operation, and the store queue is configured to cause a replay of the first load operation based on the detection of a hit on the first store operation and a lack of first store data associated with the first store operation in the store queue.

The CIF 34 may be responsible for communicating with the rest of a system including the processor 12, on behalf of the processor 12. For example, the CIF 34 may be configured to request data for DCache 16 misses and ICache 18 misses. When the data is returned, the CIF 34 may signal the cache fill to the corresponding cache. For DCache fills, the CIF 34 may also inform the LSU 20 (and more particularly the LEQ 44 and the LRQ 46). The LEQ 44 may attempt to schedule replayed loads that are waiting on the cache fill so that the replayed loads may forward the fill data as it is provided to the DCache 16 (referred to as a fill forward operation). If the replayed load is not successfully replayed during the fill, the replayed load may subsequently be scheduled and replayed through the DCache 16 as a cache hit. The LRQ 46 may track cache hit/miss status and thus may be informed of cache fills so that the cache hit/miss status may be updated. The CIF 34 may also writeback modified cache lines that have been evicted by the DCache 16, merge store data for non-cacheable stores, etc.

The execution units 28 may include any types of execution units in various embodiments. For example, the execution units 28 may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector ops may be used, e.g. to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, vector ops include single instruction-multiple data (SIMD) or vector operations on an operand that represents multiple media data.

Thus, each execution unit 28 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 28 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

While the illustrated embodiment employs the LEQ 44 and LRQ 46 for load ops, other embodiments may employ a single load queue with a single entry for each load op that handles replays and redirects/flushes. The combination of the LEQ 44 and LRQ 46 may equivalently be a load queue (LDQ) 54.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 2:
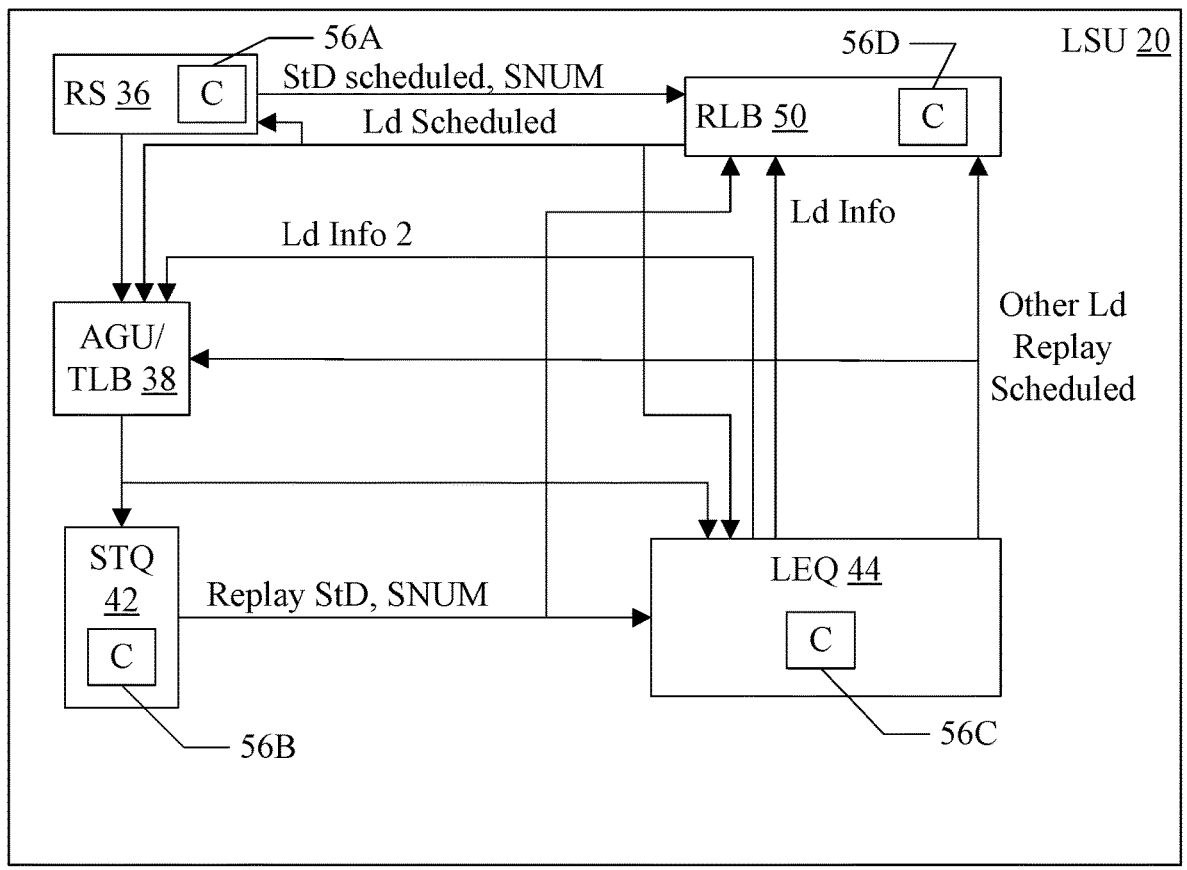
FIG. 2 is a block diagram illustrating the load/store unit in greater detail.

Turning now to FIG. 2, a block diagram of one embodiment of the LSU 20 in more detail is shown. The RS 36, the AGU/TLB 38, the STQ 42, the LEQ 44, and the RLB 50 are shown, along with certain interconnect therebetween for an embodiment. In the illustrated embodiment, the RS 36, the STQ 42, the LEQ 44, and the RLB 50 may include content addressable memories (CAMs, illustrated as "C" in FIG. 2, reference numerals 56A-56D). The CAMs 56A-56D may be used to compare various data queued in the respective circuits (e.g. the RS 36 may CAM register addresses to determine when operands will be ready in the CAM 56A, the STQ 42 may CAM store addresses of store ops in the STQ 42 to load addresses in the CAM 56B, the LEQ 44 may CAM load addresses against store addresses, and store identifiers (e.g. SNUMs) against store identifiers that causes loads to replay in the CAM 56C, and the RLB may CAM store identifiers from the RS 36 as well in the CAM 56D.

The RS 36 is coupled to the AGU/TLB 38, and issues load and store ops for execution as previously described. Additionally, replayed loads from either the RLB 50 ("Ld Scheduled") in FIG. 2 and LEQ 44 ("Other Ld Replay Scheduled" in FIG. 2) may be provided to the AGU/TLB 38 as well. Generally, a replayed load may take precedence over a load scheduled by the RS 36 to the same load pipe, and thus the RLB 50 and/or the LEQ 44 may signal the RS 36 may reissuing a replayed load in a given load pipe The RS 36 may be configured to cancel a load op that it may have scheduled to the given load pipe. In an embodiment, the RLB 50 may take precedence over the LEQ 44 if both the RLB 50 and the LEQ 44 attempt to replay a load in the same load pipe. Alternatively, the LEQ 44 may be given precedence, or a round robin or other mechanism may be used to arbitrate between the LEQ 44 and the RLB 50, in other embodiments.

In the case that the RLB 50 issues a replayed load for reexecution, the RLB 50 may provide a portion of the data that describes the load and the remainder of the data may be provided by the LEQ 44 (illustrated as "Ld Info 2" in FIG. 2). The LEQ 44 may provide the remainder of the data at one or more pipeline stages where the data is used.

The load pipes are coupled to the STQ 42 to CAM the load addresses against store addresses in the STQ 42 for store queue hits, either to forward store data for a hitting load op or to replay the load op if the store data is not yet available. If the load is being replayed, the STQ may signal the LEQ 44 that a replay due to lack of store data has been detected ("Replay StD" in FIG. 2). The STQ 42 may also provide an identifier of the store (e.g. the SNUM in FIG. 2) to the LEQ 44. The SNUM may identify the store queue entry that is holding the store, in an embodiment. Alternatively, the SNUM may be a reorder buffer tag or other identifier that uniquely identifies the store while it is in the pipeline of the processor 12. The LEQ 44 may record the replayed load and may associate the SNUM with the replayed load in the CAM 56C within for subsequent comparing against SNUMs from the STQ 42 when store data is provided. The LEQ 44 may also provide the load data tracked by the RLB 50 for a replayed load due to lack of store data in the STQ 42 ("Ld Info" in FIG. 2). The RLB 50 may attempt to allocate an entry for the load and, if successful, may write the load data to the entry. The CAM 56D may include the portion of each entry that holds the SNUM, for comparing against SNUMs of store data ops scheduled by the RS 36. That is, when the RS 36 selects a store data op to be issued to a store pipe to deliver data to the STQ 42, the RS 36 may signal that a store data op has been scheduled ("StD scheduled in FIG. 2) and may supply the SNUM of the store. If a CAM match against the SNUM is found in the CAM 56D, the RLB 50 may schedule the replayed load to be issued.

As mentioned above, replayed loads may be tracked in the LEQ 44 in addition to the RLB 50, and thus if the RLB 50 is unable to reissue a replayed load when the store data is scheduled for some reason, then the LEQ 44 may schedule the load when the store data updates the STQ 42 and the STQ 42 forwards the SNUM to the LEQ 44 for comparing in the CAM 56C. The RLB 50 may inform the LEQ 44 when a replayed load has been issued (e.g. so that the LEQ 44 may provide the additional load data for the load to be executed), and thus the LEQ 44 may not schedule the load again if it was scheduled by the RLB 50.

The RS 36 may issue stores into the store pipes as well for execution. Store address ops may generate the store address for the store, and may write the STQ 42 at the assigned entry with the address and other store information when the store address op reaches the pipeline stage to update the STQ 42. The store may also compare against the LEQ 44 and/or the LRQ 46 (not shown in FIG. 2) to detect ordering violations.

Figure 3:
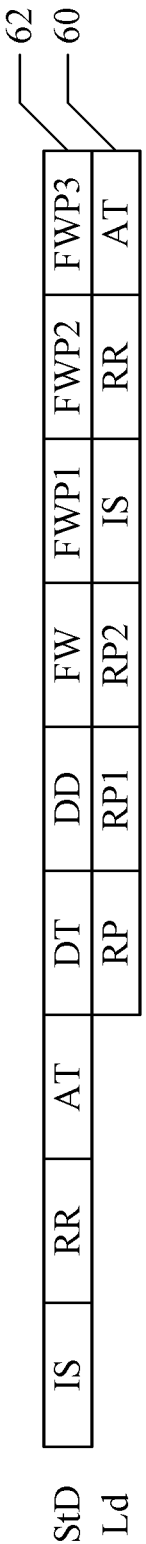
FIG. 3 is a timing diagram illustrating a store data operation and a replayed load operation when the replayed load operation is not in the replayed load buffer.
Figure 4:
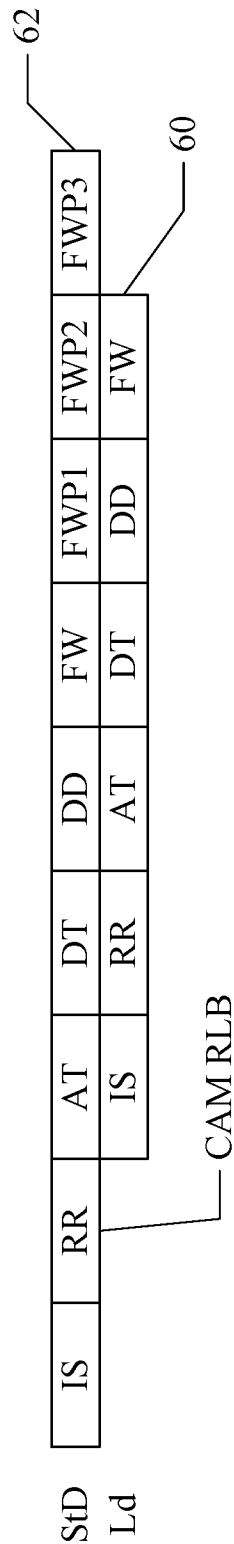
FIG. 4 is a timing diagram illustrating a store data operation and a replayed load operation when the replayed load operation is in the replayed load buffer.
Figure 5:
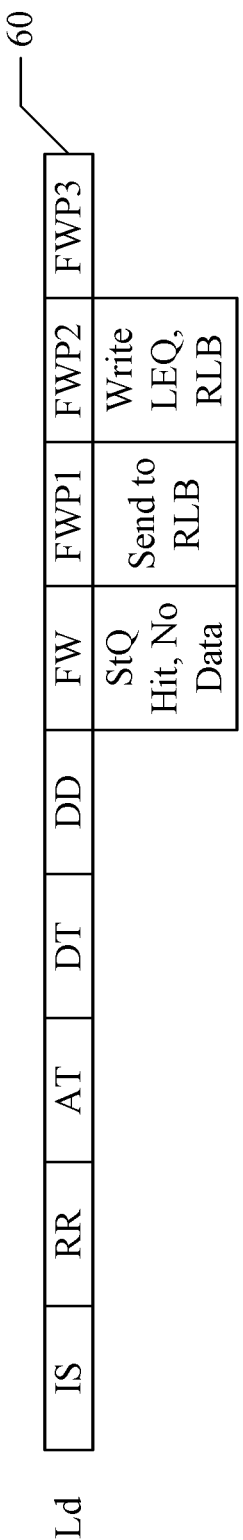
FIG. 5 is a timing diagram illustrating an initial execution of a load that hits a store operation in the store queue that does not have data.

Turning now to FIGS. 3-5, timing diagrams of a portion of a load pipeline 60 and a portion of a store pipeline 62 is shown. The pipeline stages are offset from each other in FIGS. 3-5 to show the stages occupied by a store data op ("StD") and a load op ("Ld") that depends on the store data op for store data in the same clock cycle. That is, the stages that are aligned vertically in FIGS. 3-5 are stages in which the store data op and the load op are being processed in a given clock cycle for each case. For example, the store data op is in the DT stage at the same cycle that the load op is in the RP stage in FIG. 3. A pipeline may be referred to more briefly as a "pipe" herein.

The pipeline stages shown in FIGS. 3-5 are one example of pipeline stages that may be used for load pipeline 60 and store pipeline 62. There may be multiple instances of the load pipeline 60 and/or the store pipeline 62 to permit concurrent processing of multiple loads and stores, respectively. For example, in one embodiment, there may be three load pipelines 60 and two store pipelines 62. Other embodiments may implement more or fewer load pipelines and/or store pipelines. Other embodiments may implement different stages, and/or may divide the execution tasks for loads and stores in different fashions among the stages.

In the illustrated embodiment, the stages include issue (IS), register read (RR), address generation and translation (AT), data tag lookup (DT), data read (DD), forward (FW), forward plus one (FWP1), forward plus two (FWP2), and forward plus 3 (FWP3). In the IS stage, the load or store op is selected by the reservation station 36 for execution, and is issued. In the RR stage, the source operands are read from the register file 30 and/or the operands are bypassed from the producer op (e.g. from one of the execution units 28 or from a load pipeline 60). In the AT stage, for load ops and store address ops, the address operands are added by the AGU/TLB 38 to generate the virtual address of the op. The data cache 16 data array access and the TLB tag array access may be started in the AT stage as well, in an embodiment. In an embodiment, way prediction is implemented to predict the way of the data cache 16 that will hit, and the way prediction may be made in the AT stage. In the DT stage, the TLB data array access may be performed and the hitting translation (if any) maybe provided by the AGU/TLB 38. Thus, at the end of the DT stage, the physical address of the load op or store address op may be available. The data cache 16 tag array may be accessed using an index portion of the virtual address in the DT stage as well. In an embodiment, the load virtual address may be compared to the addresses in the STQ 42 and other structures in the DT stage (e.g. the fill buffer for data cache fills, and a store merge buffer in the CIF 34, etc.) to detect forwarding from the STQ 42 or other structures, replays due to hits on the STQ 42 or other structures when data is not yet ready, etc. The comparisons may be completed in the DD stage and the forwarding path may be selected in the mux 32, in an embodiment, or the data from the data cache 16 may be processed to select the accessed data to be forwarded for a load op through the mux 32 in the DD stage as well. The data cache tags may be compared to the physical address in the DD stage to detect cache hit (and validate the way prediction in embodiments that implement the way prediction). In the FW stage, the load data may be forwarded. Additionally, in the FW stage, the physical address of the load may be compared to the STQ 42 and other structures to detect cases in which the virtual address compare did not match but the physical address did match (address aliasing). These cases cause a shadow kill, in this embodiment. For stores, the store physical address may be compared to the LRQ 46 in the FW stage to detect redirects for ordering violations.

Also illustrated in the load pipe 60 in FIG. 3 are the replay (RP), replay 1 (RP1) and replay 2 (RP2) stages. These stages may occur in the load pipe for a replayed load that has been issued by the LEQ 44 for reexecution. That is, there may be one or more pipeline stages between detection of a store data op that supplies data for a store that cause a load to previously replay and the issuance of the replayed load from the LEQ 44. These stages are represented by the RP, RP1, and RP2 stages in FIG. 3.

Generally, pipeline stages may have an order in which the op proceeds through the pipeline. A stage may be referred to as subsequent to another stage if the op is processed in the stage after it is processed in the other stage. A stage may be between two other stages if an op is processed in a first stage of the other two stages, then the stage, then the second stage of other two stages. Thus, the DT stage may be between the AT stage and the DD stage in this embodiment.

FIG. 3 is a timing diagram for a store data op and a corresponding load op that was replayed due to lack of the store data in the STQ 42 for the load op during a previous execution of the load op. In the example of FIG. 3, the load op was not allocated in the RLB 50 and thus the replaying load is issued from the LEQ 44 in this embodiment. Accordingly, the RS 36 issues the store data op into the store pipe 62 (IS stage). The store data op progresses through the RR and AT stages. At the DT stage, the SNUM of the store data op is provided to the LEQ 44 for comparison. The LEQ 44 compares the SNUM against the SNUMs in the LEQ 44, and if there is a match and the corresponding load op was replayed due to a store op for which data was unavailable, then the LEQ 44 marks the load as ready to replay (RP stage). The LEQ 44 may arbitrate among replayable load ops and may select the load op for reexecution (RP1 and RP2 stages). The load may be issued into the issue stage of the load pipe 60 (IS stage) and progress down the pipeline until a read of the STQ 42 may performed and the store data may be forwarded in the FW stage (not shown in FIG. 3).

FIG. 4, on the other hand, is a timing diagram for a store data op and a corresponding load op that was replayed due to lack of the store data in the STQ 42 for the load op during a previous execution of the load op, in which the load op as allocated in the RLB 50. In this embodiment, the RS 36 issues the store data op into the store pipe 62 (IS stage) and provides the SNUM to the RLB 50. The RLB 50 compares the SNUM while the store data op is in the RR stage, as illustrated in FIG. 4, detecting the hit on a replayed load in the RLB 50. The RLB 50 may select the load op and issue it into the load pipe 60 in the following clock cycle (while the store data op is in the AT stage). The load op flows through the RR, AT, DT, DD, and FW stages, at which the load op forwards the store data.

Comparing FIG. 3 to FIG. 4, the load op is in the issue stage 4 clock cycles earlier when issued from the RLB 50 than when issued from the LEQ 44. Accordingly, the data will be forwarded four clock cycles earlier as well, reducing the latency of the replayed load. In another embodiment, the compare may be completed while the store data op is still in the issue stage, and the load op may issue from the RLB 50 while the store op is in the RR stage. Such an embodiment may reduce latency by 5 clock cycles compared to issuing from the LEQ 44. As mentioned before, the stages in the load and store pipes 60 and 62 may vary in other embodiments and thus the latency reduction may vary as well.

FIG. 5 is a timing diagram of a load op during initial execute, when issued from the RS 36. The RS 36 transmits the load op into the issue stage (IS) of the load pipe 60, and deletes the load op. The load op progresses through the RR, AT, DT, and DD stages. At FW stage, the load pipe 60 replays the load due to a store queue hit with no data. In the FWP1 stage, the load pipe 60 may transmit the load op to the RLB 50 for allocation, and the LEQ 44 and the RLB 50 may be updated in the FWP2 stage.

Figure 6:
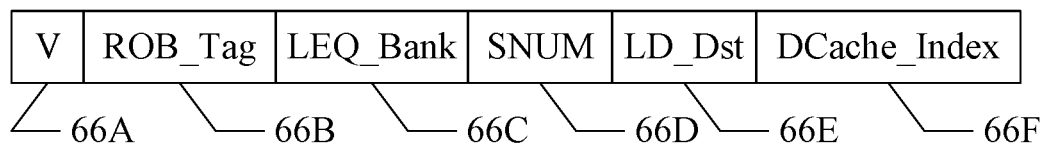
FIG. 6 is a block diagram illustrating one embodiment of an entry in the replayed load buffer.

FIG. 6 is a block diagram of one embodiment of an exemplary entry 64 that may be included in the RLB 50. That is, the RLB 50 may comprise a plurality of entries, and then entry 64 may be an example of one such entry. In the embodiment of FIG. 6, the entry includes a valid field 66A, a reorder buffer tag (ROB_Tag) field 66B, an LEQ bank (LEQ_Bank) field 66C, a store identifier (SNUM) field 66D, a load destination (LD_Dst) field 66E, and a data cache index (DCache_Index) field 66F. Other embodiments may include additional fields, subsets of the fields shown and other fields, etc.

The valid field 66A may include a valid indication (e.g. a valid bit) indicating whether the entry is valid (currently allocated to a replayed load op) or invalid (free for allocation). The reorder buffer tag field 66B may store the reorder buffer tag of the load, which may be used to flush the load from the RLB 50 if needed and may also be broadcast as part of the load reexecution. The LEQ_bank field 66C may store an indication of which LEQ bank in the LEQ 44 is storing the replayed load. In an embodiment, the LEQ 44 may have the same number of banks as load pipes, and a given bank of the LEQ 44 may reissue load ops into a given one of the load pipes (and not into the other load pipes). Thus, the LEQ_bank field 66C may be used by the RLB 50 to select which load pipe to which a load is issued for reexecution. The SNUM field 66D may store the SNUM for the store on which the load op is dependent for store data, and may be compared against the SNUMs provided by the RS 36 to determine with the load op is ready to be reissued. That is, the SNUM field 66D from each entry may comprise the CAM 56D in FIG. 2. The LD_Dst field 66E may store the register address of the destination of the load op, to be used as the address to write the register file 30 when the load op completes. The DCache_Index field 66F may be the index into the DCache 16 for the load op, which may start the lookup for the load op in the DCache 16.

Figure 7:
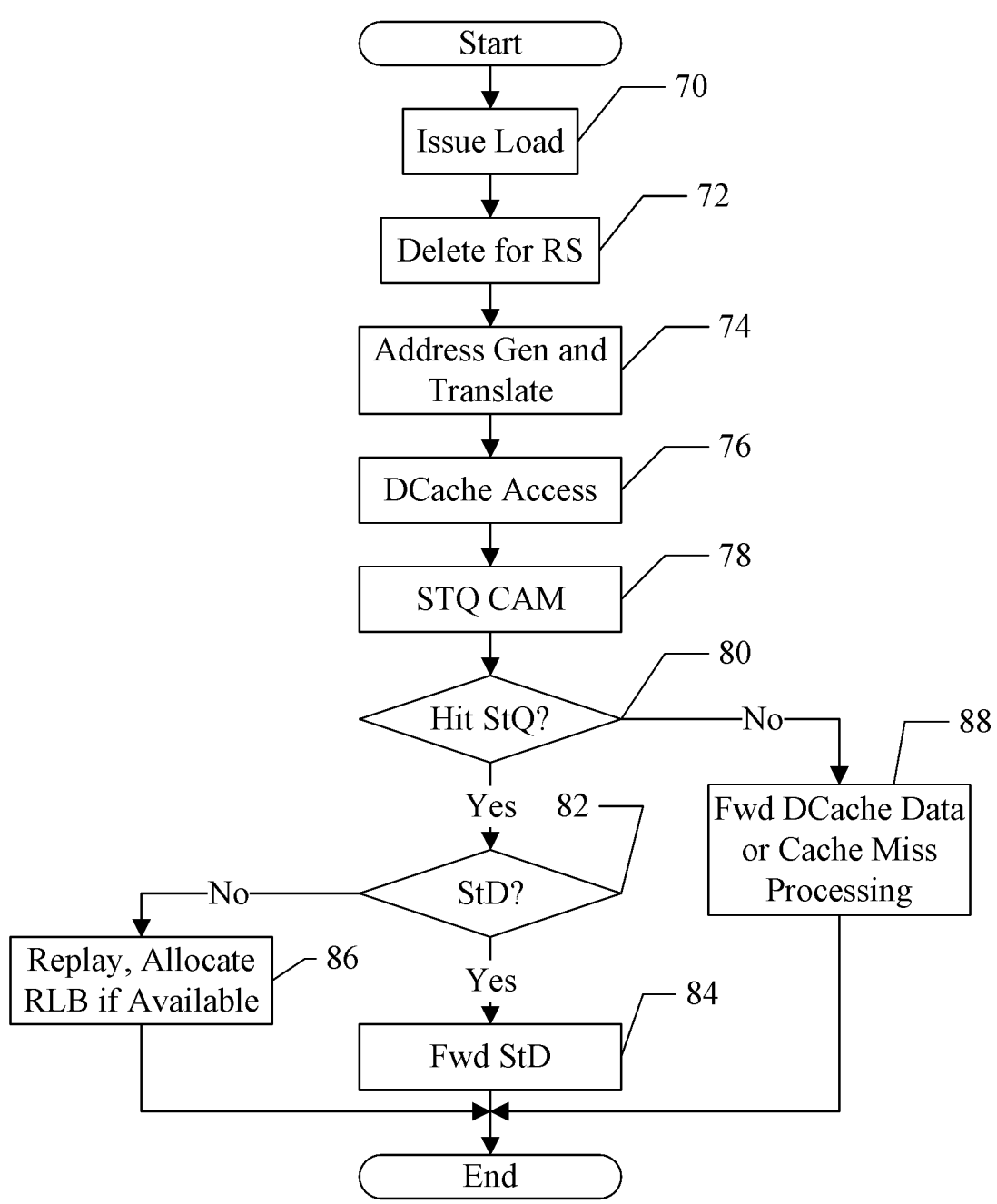
FIG. 7 is a flowchart illustrating one embodiment of execution of a load operation.

FIG. 7 is a flowchart illustrating operation of the processor 12 in one embodiment for an initial execution of a load op. While the blocks are shown in a particular order for ease of understanding, other orders may be used. Blocks may be performed in parallel by combinatorial logic in the processor 12. Blocks, combinations of blocks, and/or the flowchart as a whole may be pipelined over multiple clock cycles. The processor 12 and/or various components thereof listed below may be configured to implement the operation illustrated in FIG. 7.

The RS 36 may determine that the source operands for the load op are available, and based on arbitrating the load op and other ready ops, may select the load op for issuance. The RS 36 may issue the load into a load pipe (block 70) and may delete the load from the RS 36 (block 72). The AGU/TLB 38 may add the source operands and generate the address for the load, and may translate the address (block 74). The LSU 20 may access the DCache 16 with the load address (block 76). The STQ 42 may compare the load address against the store addresses in the STQ 42 (block 78). If the result of the compare is a STQ hit (decision block 80, "yes" leg) and the entry that is hit has store data (decision block 82, "yes" leg), the STQ 42 may forward the store data from the hitting entry (block 84). The register file 30 may write the forwarded data to the destination register of the load. If the result of the compare is a STQ hit (decision block 80, "yes" leg) and the entry that is hit does not have store data yet (decision block 82, "no" leg), the STQ 42 may signal a replay of the load. The LEQ 44 may capture the SNUM and wait for store data, and may attempt to allocate the RLB 50 if available (block 86). If the result of the compare is not a STQ hit (decision block 80, "no" leg), the DCache 16 may forward data for the load (if a cache hit) or cache miss processing may be performed (block 88). The register file 30 may update the destination register of the load with the cache hit data (or cache fill data, when the fill arrives, if a cache miss).

Figure 8:
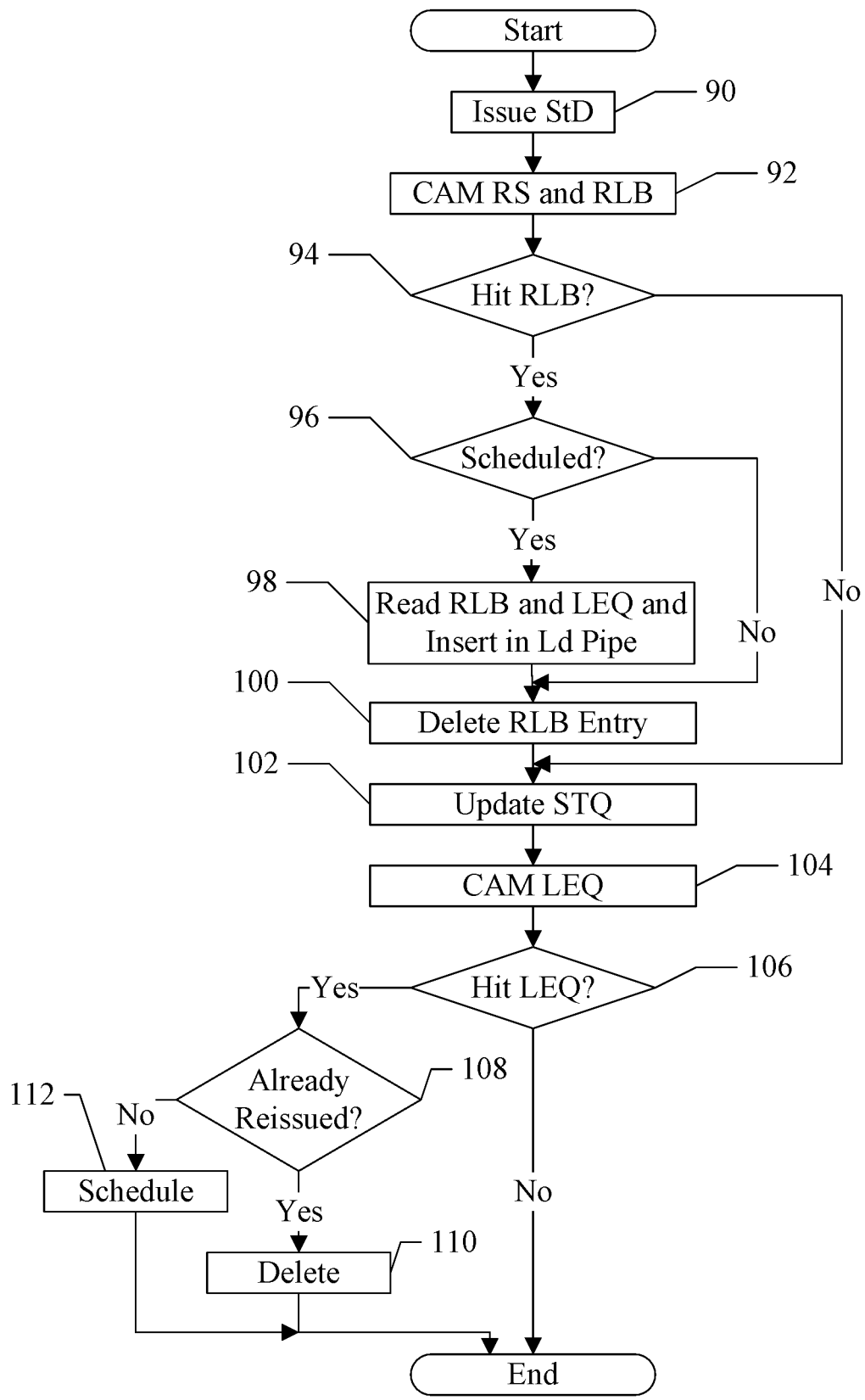
FIG. 8 is a flowchart illustrating one embodiment of execution of a store data operation.

FIG. 8 is a flowchart illustrating operation of the processor 12 in one embodiment for execution of a store data op. While the blocks are shown in a particular order for ease of understanding, other orders may be used. Blocks may be performed in parallel by combinatorial logic in the processor 12. Blocks, combinations of blocks, and/or the flowchart as a whole may be pipelined over multiple clock cycles. The processor 12 and/or various components thereof listed below may be configured to implement the operation illustrated in FIG. 8.

The RS 36 may determine that the source operand (the store data operand) for the store op is available, and based on arbitrating the store op and other ready ops, may select the store op for issuance of a store data op. The RS 36 may issue the store data op into a store pipe (block 90). As with the load op, the RS 36 may delete the store data op in response to successfully issuing the store data op. The RS 36 may compare the other ops in the RS 36 to free ops that are dependent on the store data op of the dependency (e.g. load ops that were predicted dependent by the LSD predictor 52). Additionally, the RLB 50 may compare the SNUM of the store data to detect any replayed loads that are ready to reissue for reexecution (block 92). If there is a hit in the RLB 50 (decision block 94, "yes" leg), and the RLB 50 successfully schedules the load op for issuance (decision block 96, "yes" leg), the RLB 50 may read the hitting entry and issue the load in the load pipe (block 98). The LEQ 44 may provide the additional load data for executing the load op as well (e.g. the data not stored in the RLB 50). Additionally, the LEQ 44 may mark the load as reissued, so that the LEQ 44 does not reissue the load when the store data op reaches the STQ 42. The RLB 50 may invalidate the entry, deleting the load from the RLB entry and freeing the entry for allocation to another load. If the RLB 50 does not successfully schedule the load (decision block 96, "no" leg), the RLB 50 may still invalidate the entry and may allow the LEQ 44 to reissue the load op (block 100). Alternatively, the RLB 50 may reattempt scheduling the load op for one or more clock cycles (e.g. up to the point that the LEQ 44 would schedule the load).

Subsequently, the store data op may reach the STQ 42. The STQ 42 may update the entry holding the store with the store data (block 102) and may CAM the LEQ 44 (block 104). If there is a hit in the LEQ 44 (decision block 106, "yes" leg) and the load has already been reissued by the RLB 50 (decision block 108, "yes" leg), the LEQ 44 may delete the load (assuming the load op is not replayed for another reason) (block 110). If the load was not reissued by the RLB 50 (decision block 108, "no" leg), the LEQ 44 may mark the load as ready to reissue and may schedule the load for reissue and reexecution (block 112). Once the load is reissued and completes, the LEQ 44 may delete the entry. If there is no hit in the LEQ 44 (decision block 106, "no" leg), the store data op may be complete with respect to replayed loads.

System

Figure 9:
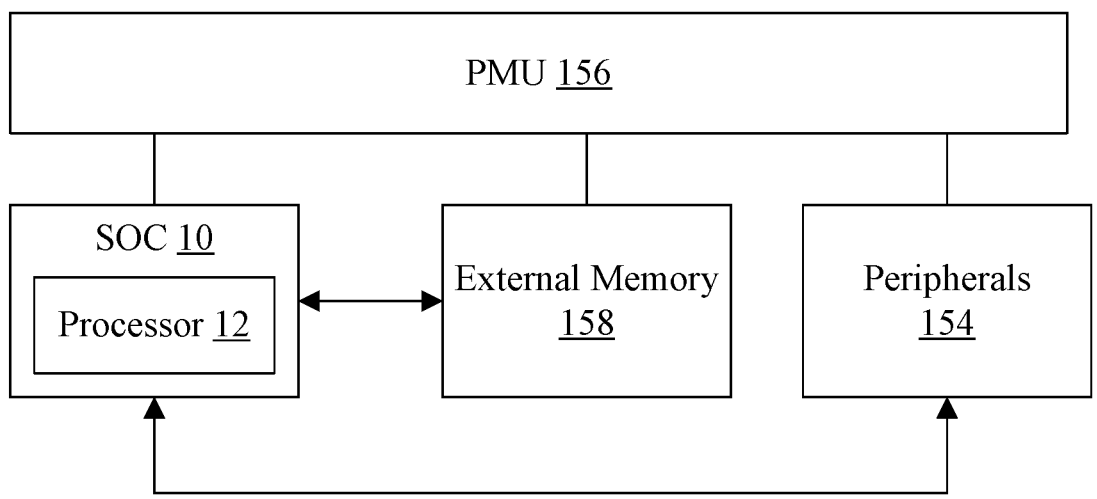
FIG. 9 is a block diagram of one embodiment of a system.

Turning next to FIG. 9, a block diagram of one embodiment of a system 150 is shown. In the illustrated embodiment, the system 150 includes at least one instance of a system on a chip (SOC) 10 coupled to one or more peripherals 154 and an external memory 158. A power supply (PMU) 156 is provided which supplies the supply voltages to the SOC 10 as well as one or more supply voltages to the memory 158 and/or the peripherals 154. In some embodiments, more than one instance of the SOC 10 may be included (and more than one memory 158 may be included as well). The SOC 10 may include one or more instances of the processor 12.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as Wi-Fi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 10 in a chip-on-chip or package-on-package implementation.

Computer Readable Storage Medium

Figure 10:
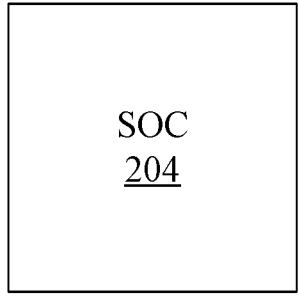
FIG. 10 is a block diagram of one embodiment of a computer accessible storage medium.

Turning now to FIG. 10, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 10 may store a database 204 representative of the SOC 10. Generally, the database 204 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 204 on the computer accessible storage medium 200 may be the netlist (with or without the synthesis library) or the data set, as desired.

While the computer accessible storage medium 200 stores a representation of the SOC 10, other embodiments may carry a representation of any portion of the SOC 10, as desired, including any subset of the processor 12 or portions thereof. The database 204 may represent any portion of the above.

Based on the above disclosure, an embodiment of a processor may comprise a reservation station, a store queue, and a replayed load buffer. The reservation station may be configured to issue a first load operation for execution. The store queue may be configured to hold store operations that have been executed but have not committed. The store queue may be configured to detect that the first load operation hits on a first store operation in the store queue during execution of the first load operation. The store queue may be configured to cause a replay of the first load operation based on the detection of a hit on the first store operation and a lack of first store data associated with the first store operation in the store queue. The replayed load buffer may be coupled in parallel with the reservation station, and may be configured to capture an identifier of the first load operation and the first store operation based on the replay of the first load operation. The replayed load buffer is configured to monitor the reservation station for issuance of a first store data operation corresponding to the first store operation and to issue the first load operation for reexecution based on the issuance of the first store data operation. The reservation station may be configured to delete the first load operation responsive to issuance of the first load operation from the reservation station. The processor may further comprise a load queue configured to hold load operations that have been to executed. A portion of the data describing the first load operation may be stored in the replayed load buffer and a remaining portion of the data may be stored in the load queue. The load queue may be configured to insert the remaining portion into a load/store pipeline when the first load operation is reexecuted. A second load operation issued by the reservation station and replayed due to a hit on a second store operation in the store queue may not be captured by the replayed load buffer based on a fullness of the replayed load buffer, and the second load operation may be rescheduled from the load queue based on the second store data operation corresponding to the second store operation updating the store queue. The update in the store queue may be detected at a later pipeline stage than a pipeline stage at which the replayed load buffer detects issuance of the first store data operation. The replayed load buffer may comprises a plurality of entries, wherein a first entry of the plurality of entries is allocated to the first load operation based on the replay of the first load operation due to the hit on the first store operation while the first store data is not available. A second load operation issued by the reservation station and replayed due to a hit on a second store operation in the store queue may be allocated a second entry of the plurality of entries in the replayed load buffer.

In an embodiment, a processor may comprise a reservation station, a store queue, and a replayed load buffer. The reservation station may be configured to issue a first load operation for execution. The reservation station may be configured to delete the first load operation responsive to issuing the first load operation. The store queue may be configured to hold store operations that have been executed but have not committed, and to detect that the first load operation hits on a first store operation in the store queue during execution of the first load operation. The store queue may be configured to cause a replay of the first load operation based on the detection of the hit on the first store operation and a lack of first store data associated with the first store operation in the store queue. The replayed load buffer may be coupled in parallel with the reservation station. The replayed load buffer is configured to capture an identifier of the first load operation and the first store operation based on the replay of the first load operation. The replayed load buffer may configured to issue the first load operation for reexecution based on the issuance of the first store data operation. The processor may further comprise a load queue configured to hold load operations that have been executed, wherein a portion of the data describing the first load operation may be stored in the replayed load buffer and a remaining portion of the data may be stored in the load queue. The load queue may be configured to insert the remaining portion into a load/store pipeline when the first load operation is reexecuted. A second load operation issued by the reservation station and replayed due to a hit on a second store operation in the store queue may not captured by the replayed load buffer based on a fullness of the replayed load buffer, and the second load operation may be rescheduled from the load queue based on the store data operation updating the store queue. The update in the store queue may be detected at a later pipeline stage than a pipeline stage at which the replayed load buffer detects issuance of the first store data operation.

In an embodiment, a method comprises issuing a first load operation for execution from a reservation station; detecting a hit on a first store operation in a store queue by the first load operation during execution of the first load operation; replaying the first load operation based on the hit on the first store operation and a lack of first store data associated with the first store operation in the store queue; capturing an identifier of the first load operation and the first store operation in a replayed load buffer coupled in parallel with the reservation station, wherein the capturing is based on the replay of the first load operation; and issuing the first load operation for reexecution based on issuance of a first store data operation from the reservation station to deliver the first store data to the store queue. The method may further comprise storing a portion of the data describing the first load operation in the replay load buffer and a remaining portion of the data in a load queue configured to hold load operations that have been executed; and inserting the remaining portion into a load/store pipeline from the load queue when the first load operation is reexecuted. The method may further comprise issuing a second load operation issued by the reservation station; replaying the second load operation due to a hit on a second store operation in the store queue, wherein the replayed load buffer does not capture the second load operation based on a fullness of the replayed load buffer; and rescheduling the second load operation from the load queue based on a second store data operation corresponding to the second store operation updating the store queue with second store data for the second store data operation. The method may further comprise deleting the first load operation from the reservation station responsive to issuance of the first load operation from the reservation station. The replayed load buffer may comprise a plurality of entries, and the method may further comprise allocating a first entry of the plurality of entries to the first load operation based on the replay of the first load operation due to the hit on the first store operation while the first store data is not available. The method may further comprise issuing a second load operation from the reservation station; replaying the second load operation due to a hit on a second store operation in the store queue; and allocating a second entry of the plurality of entries in the replayed load buffer. The method may further comprise monitoring the reservation station by the replayed load buffer to detect issuance of the first store data operation.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable to manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor comprising:
   a reservation station configured to issue a first load operation for execution;
   a store queue configured to hold store operations that have been executed but have not committed, wherein the store queue is configured to detect that the first load operation hits on a first store operation in the store queue during execution of the first load operation, and wherein the store queue is configured to cause a replay of the first load operation based on the detection of a hit on the first store operation and a lack of first store data associated with the first store operation in the store queue; and
   a replayed load buffer coupled in parallel with the reservation station, wherein the replayed load buffer is configured to capture an identifier of the first load operation and the first store operation based on the replay of the first load operation, wherein the replayed load buffer is configured to monitor the reservation station for issuance of a first store data operation corresponding to the first store operation and to issue the first load operation for reexecution based on the issuance of the first store data operation.

2. The processor as recited in claim 1 wherein the reservation station is configured to delete the first load operation responsive to issuance of the first load operation from the reservation station.

3. The processor as recited in claim 1 further comprising a load queue configured to hold load operations that have been executed, wherein a portion of the data describing the first load operation is stored in the replayed load buffer and a remaining portion of the data is stored in the load queue.

4. The processor as recited in claim 3 wherein the load queue is configured to insert the remaining portion into a load/store pipeline when the first load operation is reexecuted.

5. The processor as recited in claim 3 wherein a second load operation issued by the reservation station and replayed due to a hit on a second store operation in the store queue is not captured by the replayed load buffer based on a fullness of the replayed load buffer, and wherein the second load operation is rescheduled from the load queue based on the second store data operation corresponding to the second store operation updating the store queue.

6. The processor as recited in claim 5, wherein the update in the store queue is detected at a later pipeline stage than a pipeline stage at which the replayed load buffer detects issuance of the first store data operation.

7. The processor as recited in claim 1 wherein the replayed load buffer comprises a plurality of entries, wherein a first entry of the plurality of entries is allocated to the first load operation based on the replay of the first load operation due to the hit on the first store operation while the first store data is not available.

8. The processor as recited in claim 7 wherein a second load operation issued by the reservation station and replayed due to a hit on a second store operation in the store queue is allocated a second entry of the plurality of entries in the replayed load buffer.

9. A processor comprising:
   a reservation station configured to issue a first load operation for execution, wherein the reservation station is configured to delete the first load operation responsive to issuing the first load operation;
   a store queue configured to hold store operations that have been executed but have not committed, wherein the store queue is configured detect that the first load operation hits on a first store operation in the store queue during execution of the first load operation, and wherein the store queue is configured to cause a replay of the first load operation based on the detection of the hit on the first store operation and a lack of first store data associated with the first store operation in the store queue; and
   a replayed load buffer coupled in parallel with the reservation station, wherein the replayed load buffer is configured to capture an identifier of the first load operation and the first store operation based on the replay of the first load operation, wherein the replayed load buffer is configured to issue the first load operation for reexecution based on the issuance of the first store data operation.

10. The processor as recited in claim 9 further comprising a load queue configured to hold load operations that have been executed, wherein a portion of the data describing the first load operation is stored in the replayed load buffer and a remaining portion of the data is stored in the load queue.

11. The processor as recited in claim 10 wherein the load queue is configured to insert the remaining portion into a load/store pipeline when the first load operation is reexecuted.

12. The processor as recited in claim 11 wherein a second load operation issued by the reservation station and replayed due to a hit on a second store operation in the store queue is not captured by the replayed load buffer based on a fullness of the replayed load buffer, and wherein the second load operation is rescheduled from the load queue based on the store data operation updating the store queue.

13. The processor as recited in claim 12, wherein the update in the store queue is detected at a later pipeline stage than a pipeline stage at which the replayed load buffer detects issuance of the first store data operation.

14. A method comprising:
  issuing a first load operation for execution from a reservation station;
  detecting a hit on a first store operation in a store queue by the first load operation during execution of the first load operation;
  replaying the first load operation based on the hit on the first store operation and a lack of first store data associated with the first store operation in the store queue;
  capturing an identifier of the first load operation and the first store operation in a replayed load buffer coupled in parallel with the reservation station,
  wherein the capturing is based on the replay of the first load operation; and
  issuing the first load operation for reexecution based on issuance of a first store data operation from the reservation station to deliver the first store data to the store queue.

15. The method as recited in claim 14 further comprising:
  storing a portion of the data describing the first load operation in the replay load buffer and a remaining portion of the data in a load queue configured to hold load operations that have been executed; and
  inserting the remaining portion into a load/store pipeline from the load queue when the first load operation is reexecuted.

16. The method as recited in claim 15 further comprising:
  issuing a second load operation issued by the reservation station;
  replaying the second load operation due to a hit on a second store operation in the store queue, wherein the replayed load buffer does not capture the second load operation based on a fullness of the replayed load buffer; and
  rescheduling the second load operation from the load queue based on a second store data operation corresponding to the second store operation updating the store queue with second store data for the second store data operation.

17. The method as recited in claim 14 further comprising deleting the first load operation from the reservation station responsive to issuance of the first load operation from the reservation station.

18. The method as recited in claim 14 wherein the replayed load buffer comprises a plurality of entries, and the method further comprises allocating a first entry of the plurality of entries to the first load operation based on the replay of the first load operation due to the hit on the first store operation while the first store data is not available.

19. The method as recited in claim 18 further comprising:
  issuing a second load operation from the reservation station;
  replaying the second load operation due to a hit on a second store operation in the store queue; and
  allocating a second entry of the plurality of entries in the replayed load buffer.

20. The method as recited in claim 14 further comprising monitoring the reservation station by the replayed load buffer to detect issuance of the first store data operation.

* * * * *